United States Patent
Hakola

(10) Patent No.: US 8,917,711 B2
(45) Date of Patent: Dec. 23, 2014

(54) METHOD FOR FAST TRANSMISSION TYPE SELECTION IN WCDMA UMTS

(75) Inventor: Sami-Jukka Hakola, Kempele (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 12/739,922

(22) PCT Filed: Oct. 24, 2008

(86) PCT No.: PCT/IB2008/054406
§ 371 (c)(1),
(2), (4) Date: Aug. 2, 2010

(87) PCT Pub. No.: WO2009/053941
PCT Pub. Date: Apr. 30, 2009

(65) Prior Publication Data
US 2011/0019655 A1 Jan. 27, 2011

Related U.S. Application Data

(60) Provisional application No. 61/000,410, filed on Oct. 25, 2007.

(51) Int. Cl.
*H04W 74/08* (2009.01)
*H04W 74/00* (2009.01)

(52) U.S. Cl.
CPC ........ *H04W 74/004* (2013.01); *H04W 74/0866* (2013.01); *H04W 74/0833* (2013.01)
USPC ........................................... 370/342

(58) Field of Classification Search
CPC ............................................... H04W 74/0833
USPC ......... 370/329, 335, 336, 341, 342, 345, 441, 370/443, 477, 479
See application file for complete search history.

(56) References Cited

U.S. PATENT DOCUMENTS

| 5,630,081 A | 5/1997 | Rybicki et al. |
| 5,796,738 A | 8/1998 | Scott et al. |

(Continued)

FOREIGN PATENT DOCUMENTS

| EP | 1400049 | 3/2004 |
| EP | 1439728 A | 7/2004 |

(Continued)

OTHER PUBLICATIONS

Qualcomm Europe, "Layer 1/2 aspects for enhanced UL for CELL_FACH", 3GPP TSG-RAN WG2 #59bis, R2-074390, Oct. 18-12, 2007, Shanghai China.*

(Continued)

*Primary Examiner* — Joseph Bednash
(74) *Attorney, Agent, or Firm* — Harrington & Smith

(57) ABSTRACT

In accordance with the exemplary embodiments of the invention there is disclosed a method, apparatus, and executable computer program for receiving information including preamble scrambling codes associated with transmission types in a random access procedure, selecting an appropriate preamble scrambling code based on the received information, and placing the selected preamble scrambling code in a preamble for a random access procedure. Further in accordance with the exemplary embodiments of the invention there is disclosed a method, apparatus, and executable computer programs for decoding a preamble scrambling code of a random access channel transmission received from a user equipment, and determining a transmission type with which the scrambling code is associated.

18 Claims, 5 Drawing Sheets

31 A user equipment receiving from a network device information comprising preamble scrambling codes associated with transmission types in a random access procedure 32 The user equipment selecting an appropriate preamble scrambling code 33 The user equipment transmitting in a random access procedure the selected preamble scrambling code in a preamble

(56) References Cited

U.S. PATENT DOCUMENTS

| | | | |
|---|---|---|---|
| 5,966,636 | A | 10/1999 | Corrigan et al. |
| 6,098,126 | A | 8/2000 | Batson et al. |
| 6,272,117 | B1 | 8/2001 | Choi et al. |
| 6,574,267 | B1 | 6/2003 | Kanterakis et al. |
| 6,611,514 | B1* | 8/2003 | Moulsley ............... 370/348 |
| 6,643,318 | B1 | 11/2003 | Parsa et al. |
| 6,738,366 | B1 | 5/2004 | Etemad et al. |
| 6,859,445 | B1* | 2/2005 | Moon et al. ............ 370/335 |
| 7,013,146 | B2 | 3/2006 | Wang et al. |
| 7,061,890 | B2* | 6/2006 | Kim et al. .............. 370/335 |
| 7,324,565 | B2* | 1/2008 | Malkamaki ............ 370/535 |
| 7,848,281 | B2* | 12/2010 | Bienas et al. ........... 370/329 |
| 2003/0103476 | A1* | 6/2003 | Choi et al. ............. 370/329 |
| 2003/0223452 | A1 | 12/2003 | Toskala et al. |
| 2004/0110521 | A1 | 6/2004 | Soldani et al. |
| 2004/0136403 | A1 | 7/2004 | Kekki ..................... 370/477 |
| 2005/0047344 | A1 | 3/2005 | Seol |
| 2005/0122933 | A1 | 6/2005 | Kwon et al. |
| 2005/0157678 | A1 | 7/2005 | Mantha et al. |
| 2005/0243763 | A1 | 11/2005 | Toskala et al. ......... 370/328 |
| 2005/0271025 | A1* | 12/2005 | Guethaus et al. ....... 370/342 |
| 2006/0146762 | A1 | 7/2006 | Kuroda et al. |
| 2006/0183429 | A1 | 8/2006 | Anderson |
| 2006/0209692 | A1 | 9/2006 | Usuda et al. |
| 2006/0268717 | A1 | 11/2006 | Kanterakis ............. 370/235 |
| 2006/0281417 | A1 | 12/2006 | Umesh et al. |
| 2007/0064665 | A1 | 3/2007 | Zhang et al. |
| 2007/0104177 | A1 | 5/2007 | Hwang et al. |
| 2007/0147326 | A1 | 6/2007 | Chen |
| 2007/0189237 | A1* | 8/2007 | Jaatinen et al. ........ 370/335 |
| 2007/0189365 | A1 | 8/2007 | Olsson et al. |
| 2008/0192766 | A1 | 8/2008 | Ranta-Aho et al. |
| 2009/0268676 | A1 | 10/2009 | Wigard et al. |
| 2010/0182974 | A1 | 7/2010 | Barraclough et al. |
| 2012/0140715 | A1 | 6/2012 | Cave et al. ............. 370/329 |

FOREIGN PATENT DOCUMENTS

| | | |
|---|---|---|
| EP | 1643690 A1 | 4/2006 |
| EP | 1743503 | 1/2007 |
| WO | 0021320 A1 | 4/2000 |
| WO | 03003643 A1 | 1/2003 |
| WO | 03100988 A2 | 12/2003 |
| WO | 2005109941 A1 | 11/2005 |
| WO | 2008053321 A2 | 5/2008 |
| WO | 2008156315 A2 | 12/2008 |
| WO | 2009020423 A1 | 2/2009 |

OTHER PUBLICATIONS

Arzelier, "Current Minutes of the 59bis TSG-RAN WG2 meeting", Shanghai, China, Oct. 16, 2007, pp. 72-74.*

LG Electronics, "Discussion on RACH Enhancements", 3GPP TSG-RAN WG2 #59bis, R2-074165, Oct. 18-12, 2007, Shanghai China.*

NSN, Nokia, "Enhanced Random Access with E-DCH", 3GPP TSG-RAN WG2 #59bis, R2-074010, Oct. 18-12, 2007, Shanghai China.*

NSN, Nokia, "Further discussion on enhanced CELL_FACH in REL8", 3GPP TSG-RAN WG2 #59, R2-073254, Aug. 20-24, 2007, Athens, Greece.*

Nokia Corporation, Nokia Siemens Networks, "Collision detection mechanism in enhanced Random Access with E-DCH", 3GPP TSG-RAN WG2 #59bis, R2-074013, Oct. 18-12, 2007, Shanghai China.*

Office Action received from Korean Patent Application No. 2010-07011344, dated May 31, 2011, 6 pages.

International Search Report and Written Opinion of the International Searching Authority received from PCT Patent Application No. PCT/IB2008/054406, dated Mar. 20, 2009, 15 pages.

Office Action received from European Patent Application No. 08841323.2, dated Dec. 10, 2010, 5 pages.

3GPP TS 25.211 V4.0.0 (Mar. 2001); "3rd Generation Partnership Project; Technical Specification Group Radio Access Network; Physical channels and mapping of transport channels onto physical channels (FDD) (Release 4)"; Mar. 2001; whole document (45 pages).

3GPP TS 25.211 V4.6.0 (Sep. 2002); "3rd Generation Partnership Project; Technical Specification Group Radio Acces Network; Physical channels and mapping of transport channels onto physical channels (FDD) (Release 4)"; Sep. 2002; whole document (46 pages).

3GPP TS 25.212 V4.6.0 (Sep. 2002): "3rd Generation Partnership Project; Technical Specification Group Radio Access Network; Multiplexing and channel coding (FDD) (Release 4)"; Sep. 2002; whole document (62 pages).

3GPP TS 25.213 V4.4.0 (Dec. 2003); "3rd Generation Partnership Project; Technical Specification Group Radio Access Network; Spreading and modulation (FDD) (Release 4)"; Dec. 2003; whole document (26 pages).

3GPP TS 25.214 V4.6.0 (Mar. 2003); "3rd Generation Partnership Project; Technical Specification Group Radio Access Network; Physical layer procedures (FDD) (Release 4)"; Mar. 2003; whole document (53 pages).

3GPP TS 25.214 V7.5.0 (May 2007); "3rd Generation Partnership Project; Technical Specification Group Radio Access Network; Physical layer procedures (FDD) (Release 7)"; May 2007; whole document (84 pages).

3GPP TS 25.215 V4.8.0 (Mar. 2005); "3rd Generation Partnership Project; Technical Specification Group Radio Access Network; Physical layer—Measurements (FDD) (Release 4)"; Mar. 2005; whole document (18 pages).

3GPP TS 25.308 V7.3.0 (Jun. 2007); "3rd Generation Partnership Project; Technical Specification Group Radio Access Network; High Speed Downlink Packet Access (HSDPA); Overall description; Stage 2 (Release 7)"; Jun. 2007: whole document (47 pages).

3GPP TS 25.309 V6.6.0 (Mar. 2006); "3rd Generation Partnership Project; Technical Specification Group Radio Access Network; FDD Enhanced Uplink; Overall description; Stage 2 (Release 6)"; Mar. 2006; whole document (34 pages).

3GPP TS 25.321 V6.10.0 (Sep. 2006); "3rd Generation Partnership Project; Technical Specification Group Radio Access Network; Medium Access Control (MAC) protocol specification (Release 6)"; Sep. 2006: whole document (91 pages).

Cao, B. et al,: "Adaptive Channel Switching for Admission Control With QoS and Priority in WCDMA Uplink"; 2004; whole document (8 pages), IEEE.

Etemad, K.; "Enhanced Random Access and Reservation Scheme in CDMA2000"; IEEE Personal Communications; Apr. 2001; whole document (7 pages.).

Ghosh, A. et al.; "Overview of Enhanced Uplink for 3GPP W-CDMA" 2004; whoe document (5 pages); IEEE.

Reig, J. et al.: "Random Access Channel (RACH) Parameters Optimization in WCDMA Systems"; 2004; whole document (5 pages); IEEE.

Itri: "Layer 1 Procedure of Non-synchronized Random Access in E-UTRA": 3GPP TSG RAN WG1 Meeting #46bis; R1-062501; Oct. 9-13, 2006; Seoul, Korea; whole document (5 pages).

Nokia; "Further discussion on delay enhancements in Rel7"; 3GPP TSG-RAN WG2 Meeting #53; R2-061189; May 8-12, 2006; Shanghai, China; whole document (5 pages).

Nokia et al.; "Enhanced CELL_FACH State with E-DCH"; 3GPP TSG-RAN WG2 Meeting #59bis; R1-074300; Oct. 8-12, 2007; Shanghai, China; whole document (2 pages).

Nokia et al.; "On collision resolution with Enhanced UL CELL_FACH state"; 3GPP TSG-RAN WG2 Meeting #60; R2-074622; Nov. 5-9, 2007; Jeju, Korea; whole document (3 pages).

"Golden Bridge Technology, Intellectual Property"; Retrieved on Apr. 18, 2012; URL: http://www.gbtwireless.com/IntellectualProp.htm.; whole document (2 pages).

* cited by examiner

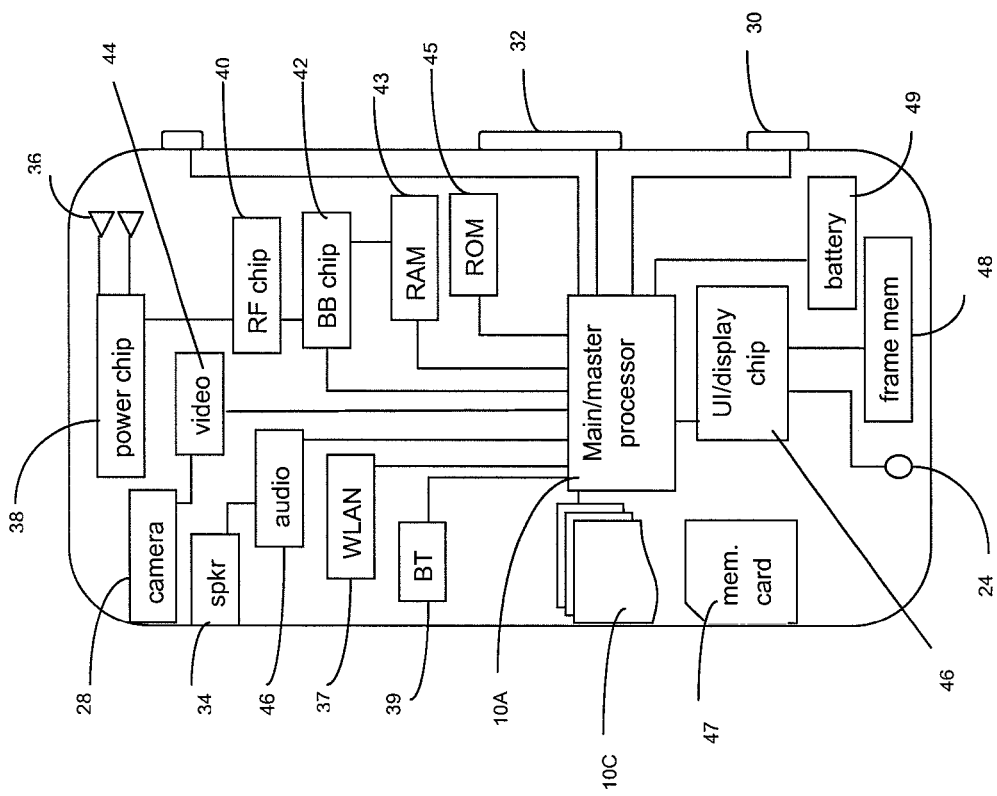
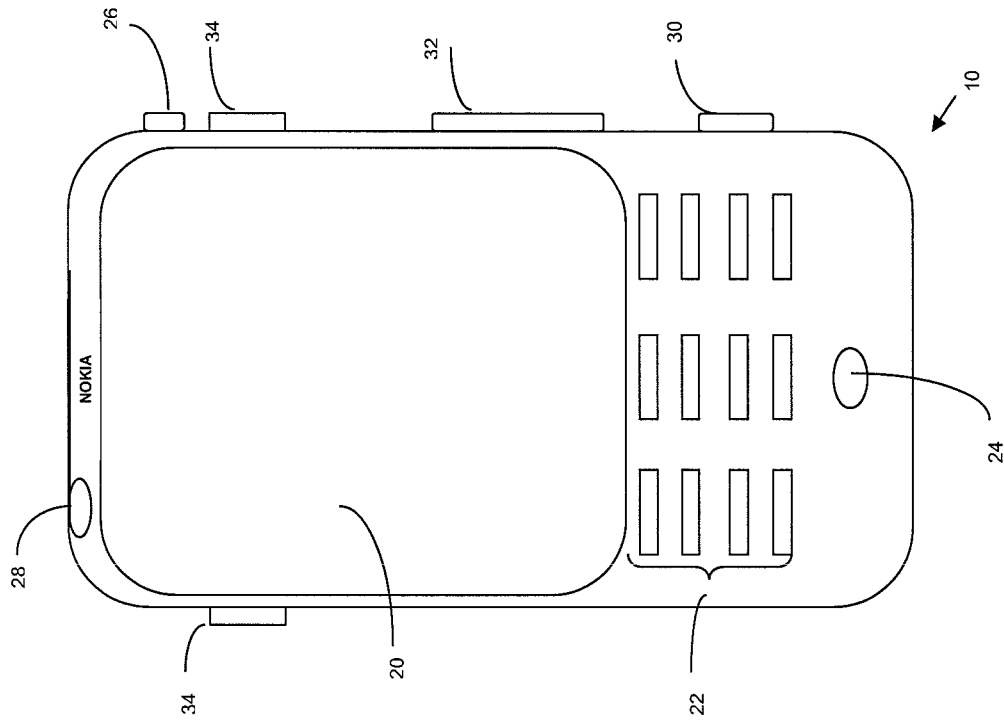
Fig 1B

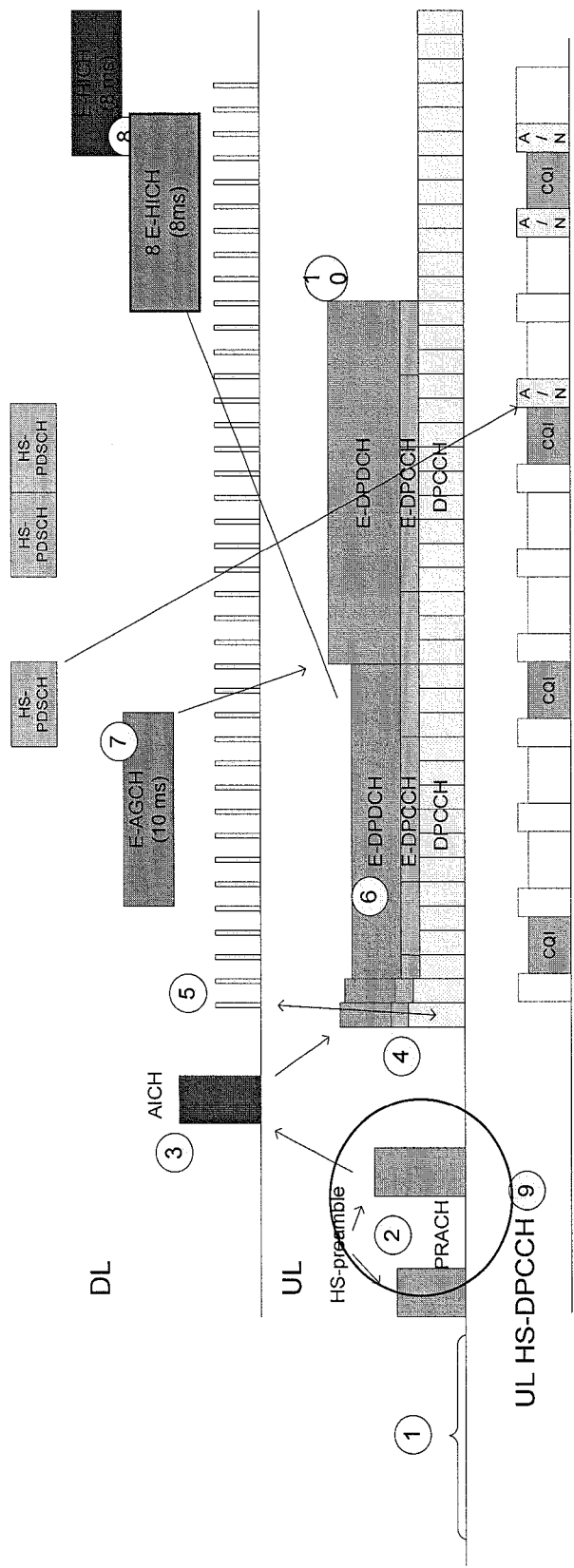
Figure 2: schematic HS-RACH procedure

METHOD FOR FAST TRANSMISSION TYPE SELECTION IN WCDMA UMTS

RELATED APPLICATION

This application was originally filed as PCT Application No. PCT/IB2008/054406 filed Oct. 24, 2008, which claims priority to U.S. Application No. 61/000,410 filed Oct. 25, 2007.

DETAILED DESCRIPTION

Technical Field

The exemplary and non-limiting embodiments of this invention relate generally to wireless communication systems, methods, devices and computer program products and, more specifically, relate to techniques for sending information from a user equipment to a wireless network element over a random access channel.

BACKGROUND

The following abbreviations are herewith defined:
3GPP third generation partnership project
ARQ automatic repeat request
F-DPCH fractional dedicated physical channel
E-DCH enhanced dedicated channel
E-DPCCH enhanced dedicated physical control channel (uplink L1 information concerning data rate)
E-DPDCH enhanced dedicated physical channel (uplink data channels)
E-HICH E-DCH hybrid ARQ indicator channel (in downlink)
E-AGCH E-DCH absolute grant channel (in downlink)
HS high speed
HSUPA high speed uplink packet access
L1 Layer 1 (physical)
Node-B base station
PRACH physical (or packet) random access channel
RACH random access channel
TCP transport control protocol
UE user equipment
WCDMA wideband code division multiple access This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Communication systems and networks, such as, for example, mobile telephone or cellular systems have greatly expanded and are in widespread use and enjoy increased popularity as the communication device of choice. One reason for such popularity is the mobility of users to travel from area-to-area and receive service. These communication devices typically establish end-to-end communication through a network. In its most simplistic terms, unlike hardwired "land" communications, mobile telecommunication devices or user equipment (UE), such as, cellular telephones must establish a connection to a serving controller coupled to a network to carry communication data. Accordingly, a procedure is carried out between the UE and network via a network element (e.g., Node B) to establish a connection. The operation, features and advantages of cellular type communication and devices are well known.

An uplink access channel, broadly referred to herein as the random access channel (RACH), is one typically utilized by user equipment (UE) for initial access signaling to a network in instances when no dedicated or shared physical channel connection is currently established. For example, the RACH can be used for initial cell access after the UE powers-on. The RACH can be used to perform a location update after the UE moves from one location to another, for initiating a call or for user data transmission. The RACH capture procedure specified by the $3^{rd}$ Generation Partnership Project (3GPP) requires the UE to transmit a series of access preambles each with increasing transmit power for each access preamble attempt. Each of the access attempts is separated by an appropriate waiting time of sufficient duration to allow detection of an acknowledgment indication (AI) signal from the receiving station Node B.

It is noted that for RACH Release 99 the data rates are very low. More specifically, the practical instantaneous data rate is 16 kbps (16 thousand bits per second, or 320 bits in 20 ms) and effectively <10 kbps when preamble power ramping is taken into account. Further, in the event of a failed RACH transmission the retransmission delays are significant, on the order of seconds.

SUMMARY

In an exemplary aspect of the invention, there is a method comprising receiving information comprising preamble scrambling codes associated with transmission types in a random access procedure, selecting an appropriate preamble scrambling code based on the received information, and placing the selected preamble scrambling code in a preamble for a random access procedure.

In an exemplary aspect of the invention there is a computer readable medium encoded with a computer program executable by a processor to perform actions comprising receiving information comprising preamble scrambling codes associated with transmission types in a random access procedure, selecting an appropriate preamble scrambling code based on the received information, and placing the selected preamble scrambling code in a preamble for a random access procedure.

In another exemplary aspect of the invention there is an apparatus comprising a receiver, the receiver configured to receive information comprising preamble scrambling codes associated with transmission types in a random access procedure, a processor configured to select an appropriate preamble scrambling code based on the received information, and the processor further configured to place the selected preamble scrambling code in a preamble for a random access procedure.

In another exemplary aspect of the invention there is an apparatus comprising means for receiving information comprising preamble scrambling codes associated with transmission types in a random access procedure, means for selecting an appropriate preamble scrambling code based on the received information, and means for placing the selected preamble scrambling code in a preamble for a random access procedure.

In still another exemplary aspect of the invention there is a method comprising decoding a preamble scrambling code of a random access channel transmission received from a user equipment, and determining a transmission type with which the scrambling rode is associated.

In another exemplary aspect of the invention there is a computer readable medium encoded with a computer program executable by a processor to perform actions comprising decoding a preamble scrambling code of a random access channel transmission received from a user equipment, and determining a transmission type with which the scrambling code is associated.

In yet another exemplary aspect of the invention there is an apparatus comprising a processor configured to decode a preamble scrambling code of a random access channel transmission received from a user equipment, and the processor configured to determine a transmission type with which the scrambling code is associated.

In still another exemplary aspect of the invention there is an apparatus comprising means for decoding a preamble scrambling code of a random access channel received from a user equipment, and means for determining a transmission type with which the scrambling code is associated.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1B illustrates a more particularized block diagram of a user equipment that is suitable for use in practicing the exemplary embodiments of the invention.

FIG. 2 illustrates a non-limiting arrangement of uplink channels and downlink channels for implementing the HS-RACH in accordance with the exemplary embodiments of this invention;

DETAILED DESCRIPTION

The exemplary embodiments of the invention are related to applications previously filed as U.S. Provisional Patent Application 859.0036.U1(P1), "Usage of E-DCH as RACH shared channel," now U.S. Ser. No. 60/848,106, filed on Sep. 26, 2006 and also U.S. Provisional Patent Application 944-017.032, "Collision detection for random access procedure," now U.S. Ser. No. 60/897,328, filed Jan. 25, 2007.

Those disclosures describe a base for high speed and high data rate random access, referred to in this document as "High Speed Random Access Channel" (HS-RACH) and Fast (E-DCH) access.

Further, it is noted that certain elements of those disclosures have been accepted in 3GPP as a work item, specifically that E-DCH can be used as a transport channel.

In the previously mentioned U.S. Provisional Patent Applications, random access slots or signatures within an access slot are divided between R'99 RACH users and UEs wanting to have fast E-DCH access. Thus, a problem is seen as the collision probability is increased in a system because possible resources are divided.

In addition, a problem may exist in that the E-DCH can support two different TTI lengths, namely 2 and 10 ms. Further, a request for R'99 RACH, 10 ms E-DCH or 2 ms E-DCH would generally be initiated by the UE because Node B cannot know for example path loss or any other measurements in the random access phase. In addition, the Node B may not have an indication of what the UE capability can support (e.g. 2 ms E-DCH).

In this regard it is noted that if access slots or signatures within an access slot are further divided into three categories to cover R'99 RACH, 10 ms E-DCH and 2 ms E-DCH requests, the collision probability will become more acute in a system.

In an exemplary non-limiting embodiment of the Invention a Node B broadcasts scrambling codes to be used for PRACH preambles for each transmission type, namely for R'99 RACH, 10 ms E-DCH and 2 ms E-DCH. Thus, when a UE wants to request any of the transmission types, it selects the appropriate scrambling code and then normally uses the whole PRACH access slot and signature space.

Figure 1A:
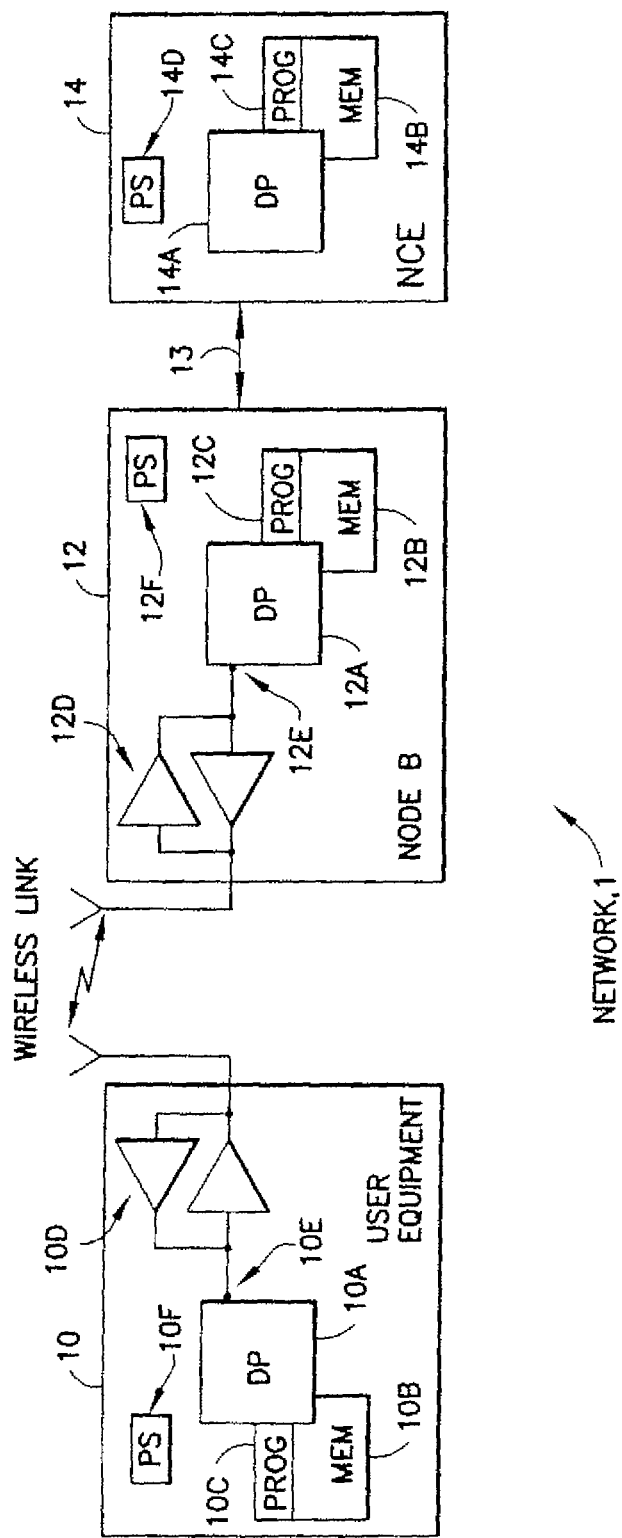
FIG. 1A illustrates a simplified block diagram of various electronic devices that are suitable for use in practicing the exemplary embodiments of this invention.

Reference is made first to Figure IA for illustrating a simplified block diagram of various electronic devices that are suitable for use in practicing the exemplary embodiments of this invention. In FIG. 1 a wireless network 1 is adapted for communication with a UE 10 via a Node B (base station) 12. The network I may include a network control element (NCE) 14. The UE 10 includes a data processor (DP) WA, a memory (MEM) 10B that stores a program (PROG) 10C, an interface 10E to a suitable radio frequency (RF) transceiver 10D for bidirectional wireless communications with the Node B 12, and a preamble searcher (PS) 10F for identifying or selecting an appropriate preamble scrambling code, which also includes a DP 12A, a MEM 12B that stores a PROG 12C, an interface 12E to a suitable RF transceiver 12D, and a preamble searcher (PS) 12F for identifying or selecting an appropriate preamble scrambling code. The Node B 12 is coupled via a data path 13 to the NCE 14 that also includes a DP 14A, a MEM 14B storing an associated PROG 14C, and a preamble searcher 14D for identifying or selecting an appropriate preamble scrambling code. At least one of the PROGs 10C and 12C is assumed to include program instructions that, when executed by the associated DP, enable the electronic device to operate in accordance with the exemplary embodiments of this invention, as will be discussed below in greater detail. Further, it is noted that in accordance with a non-limiting aspect of the exemplary embodiments of the invention, any transceiver disclosed can include a separate receiver and transmitter component or circuit.

That is, the exemplary embodiments of this invention may be implemented at least in part by computer software stored on the memory 10B/12B and executable by the DP 10A of the UE 10 and by the DP 12A of the Node B 12, or by hardware, or by a combination of software and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

FIG. 1B illustrates further detail of an exemplary UE in both plain view (left) and sectional view (right), and the invention may be embodied in one or some combination of those more function-specific components. At FIG. 1B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 1B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforeseaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention are most relevant to one or more of the processors 38, 40, 42, 44, 46, 50, and one or more of the memories 43, 45, 47, though it is noted that other embodiments need not be disposed there but may be disposed across various chips and memories as shown or disposed within another processor that combines some of the functions described above for FIG. 1B. Any or all of these various processors of FIG. 1B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 1B.

Note that the various chips (e.g., 38, 40, 42, etc.) that were described above may be combined into a fewer number than described and, in a most compact case, may all be embodied physically within a single chip.

3GPP 25.213 v7.3.0, section 4.3.3.1 states that:
"The random access preamble code $C_{pre,n}$ is a complex valued sequence. It is built from a preamble scrambling code $S_{r-pre,n}$ and a preamble signature $C_{sig,s}$ as follows:

$$C_{pre,n,s}(k) = S_{r-pre,n}(k) \times C_{sig,s}(k) \times e^{j(\frac{\pi}{4}+\frac{\pi}{2}k)},$$

$$k = 0, 1, 2, 3, \ldots, 4095;$$

where k=0 corresponds to the chip transmitted first in time and $S_{r-pre,n}$ and $C_{sig,s}$ are defined in 4.3.3.2 and 4.3.3.3 below respectively."

Further, 3GPP 25.213 v7.3.0, section 4.3.3.2 states that:
"The scrambling code for the PRACH preamble part is constructed from the long scrambling sequences. There are 8192 PRACH preamble Scrambling codes in total.

The n:th preamble scrambling code, n=0, 1, . . . , 8191, is defined as:

$$S_{r-pre,n}(i) = c_{long,1,n}(i), i=0, 1, \ldots, 4095;$$

where the sequence $c_{long,1,n}$ is defined in subclause 4.3.2.2.

The 8192 PRACH preamble scrambling codes are divided into 512 groups with 16 codes in each group. There is a one-to-one correspondence between the group of PRACH preamble scrambling codes in a cell and the primary scrambling code used in the downlink of the cell. The k:th PRACH preamble scrambling code within the cell with downlink primary scrambling code m, k=0, 1, 2, . . . , 15 and m=0, 1, 2, . . . , 511, is $S_{r-pre,n}(i)$ as defined above with n=16×m+k."

According to embodiments of this invention different scrambling codes in a cell are associated for R'99 RACH, 10 ms E-DCH and 2 ms E-DCH. It is noted that this technique allows that the full PRACH signature space can be used within a random access procedure for each transmission type.

Further, it is noted that it may be sufficient to separate the R'99 PRACH preambles and the PRACH preambles indicating the access request to E-DCH with different scrambling codes, and/or to separate the requests for 2 ms TTI E-DCH and 10 ms TTI E-DCH with different scrambling codes in the PRACH preamble.

In accordance with exemplary embodiments of a method, apparatus and computer program product(s) there is illustrated in FIG. 2 the HS-RACH concept as outlined below:
[1] Determination of UL interference level for open loop power control
[2] R'99 random access procedure (RACH) with power ramp-up using specific HS-RACH access slots and/or signatures indicated in SIB.

[3] Access Grant and Resource Assignment
[4] Start of inner loop power control in UL, e.g. on DPCCH
[5] Start of inner loop power control in DL, e.g. on F-DPCH
[6] Start of UL data transmission, e.g. on E-DPDCH/E-DPCCH
[7] Subsequent Resource Assignment (update of existing resource assignment) and Collision detection and resolution
[8] ACK/NACK of UL data (ffs), e.g. on E-HICH
[9] ACK/NACK of DL data (ffs) and CQI for link adaptation (ffs), e.g. on HS-DPCCH
[10] Mechanisms at end of data transmission end of HS-RACH resource allocation period, collision detection, etc.

In an exemplary embodiment of the Invention there is proposed for step 2 (circled in FIG. 2) wherein the UE indicates to a Node B that it requests R'99 RACH, 10 ms E-DCH or 2 ms E-DCH resources for data transmission.

As a further non-limiting exemplary embodiment of the invention a division between requests of different transmission types by the UE is solved by assigning different scrambling codes for PRACH preambles of R'99 RACH, 10 ms E-DCH and 2 ms E-DCH.

Figure 3:
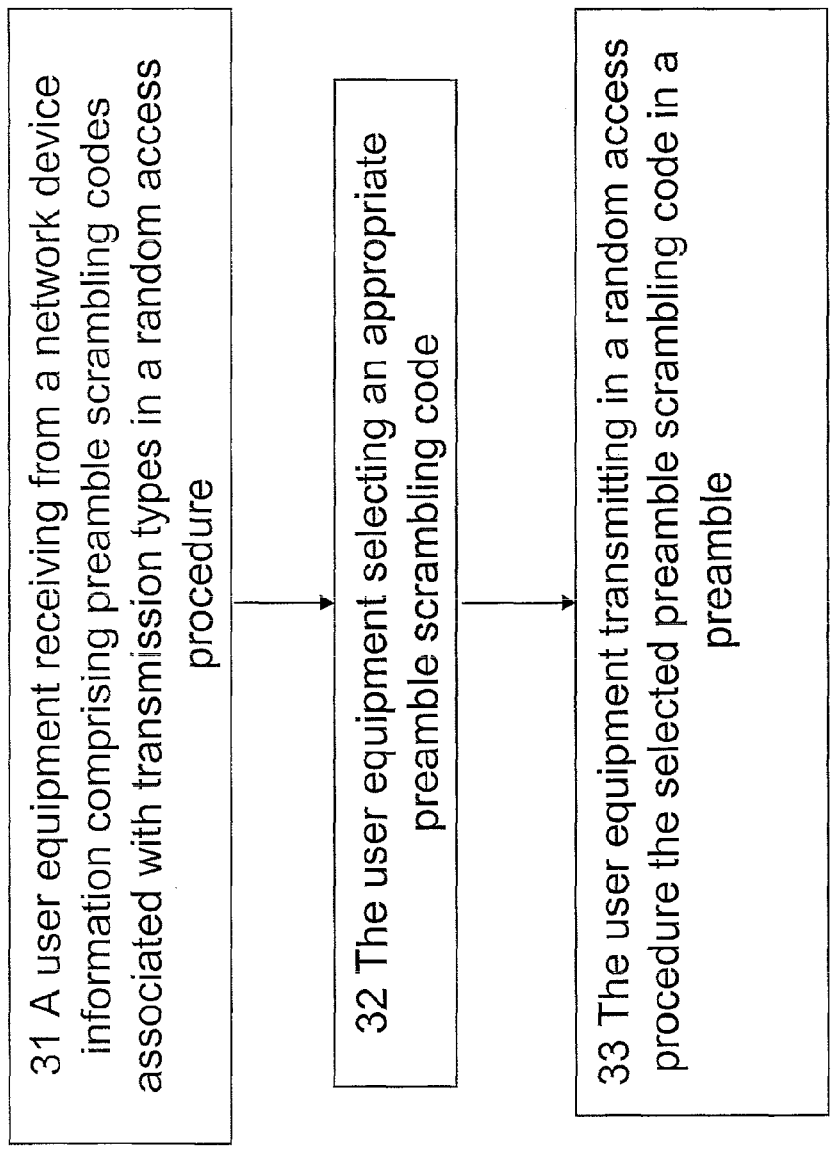
FIG. 3 illustrates a logic flow diagram that is descriptive of an exemplary embodiment of the Invention executed by a user equipment.

It is noted that the advantages of certain exemplary embodiments of the invention are at least that:
[1] UEs can use all access slots and signatures, i.e. no division among access slots or signatures between R'99 RACH, 10 ms E-DCH or 2 ms E-DCH
[2] 2 ms and 10 ms E-DCH requests by UEs do not increase collision probability
[3] Scrambling codes for E-DCH (2 ms and 10 ms) are used only during preambles and thus minimal interference added Referring to FIG. 3, there is illustrated an exemplary embodiment of the invention in a logical flow diagram of a method including a user equipment receiving from a network device information comprising preamble scrambling codes associated with transmission types in a random access procedure 310, the user equipment selecting an appropriate preamble scrambling code 320, and the user equipment transmitting in a random access procedure the selected preamble scrambling code in a preamble 330.

A method as in above further comprising storing in a local memory an association of preamble scrambling codes to transmission types, where the selecting is based on preamble scrambling codes associated in the local memory with transmission types for a transmission of that type. A method as in any above, where the information received comprises preamble scrambling codes associated with transmission types which use different length channels comprising a physical random access channel release 99, and an enhanced dedicated channel, where the enhanced dedicated channel can support lengths of 2 ms and 10 ms. Further, a method as in any above, where the information comprising preamble scrambling codes associated with transmission types is received in a broadcast message from a network device.

In accordance with the exemplary embodiments of the invention there is a computer readable medium encoded with a computer program executable by a processor to perform actions comprising receiving information comprising preamble scrambling codes associated with transmission types in a random access procedure, selecting an appropriate preamble scrambling code based on the received information, and placing the selected preamble scrambling code in a preamble for a random access procedure.

A computer readable medium encoded with a computer program as above, further comprising storing in a local memory an association of preamble scrambling codes to transmission types, where the selecting is based on preamble scrambling codes associated in the local memory with transmission types for a transmission of that type. A computer readable medium encoded with a computer program as in any above, where the information received comprises preamble scrambling codes associated with transmission types which use different length channels comprising a physical random access channel release 99, and an enhanced dedicated channel, where the enhanced dedicated channel can support lengths of 2 ms and 10 ms. In addition, a computer readable medium encoded with a computer program as in any above, where the information comprising preamble scrambling codes associated with transmission types is received in a broadcast message from a network device.

Further, in accordance with another exemplary embodiment of the invention there is an apparatus comprising a receiver, the receiver configured to receive information comprising preamble scrambling codes associated with transmission types in a random access procedure, a processor configured to select an appropriate preamble scrambling code based on the received information, and the processor further configured to place the selected preamble scrambling code in a preamble for a random access procedure.

The apparatus as above, wherein there is a local memory configured to store an association of preamble scrambling codes to transmission types, where the selecting is based on preamble scrambling codes associated in the local memory with transmission types for a transmission of that type. The apparatus as in any above, where the information received comprises preamble scrambling codes associated with transmission types which use different length channels comprising a physical random access channel release 99, and an enhanced dedicated channel, where the enhanced dedicated channel can support lengths of 2 ms and 10 ms. The apparatus as in any above, where the information comprising preamble scrambling codes associated with transmission types is received in a broadcast message from a network device.

In another non-limiting, exemplary embodiment, an apparatus comprising means for receiving information comprising preamble scrambling codes associated with transmission types in a random access procedure, means for selecting an appropriate preamble scrambling code based on the received information, and means for placing the selected preamble scrambling code in a preamble for a random access procedure.

An apparatus as above, further comprising means for storing an association of preamble scrambling codes to transmission types, where the selecting is based on stored preamble scrambling codes associated with transmission types for a transmission of that type. The apparatus The apparatus as in any above where the information received comprises preamble scrambling codes associated with transmission types which use different length channels comprising a physical random access channel release 99, and an enhanced dedicated channel, where the enhanced dedicated channel can support lengths of 2 ms and 10 ms. The apparatus as in any above, where the information comprising preamble scrambling codes associated with transmission types is received in a broadcast message from a network device. The apparatus as in any above, where the means for receiving comprises a receiver; the means for selecting and placing comprises a processor; and the means for storing comprises a memory.

Figure 4:
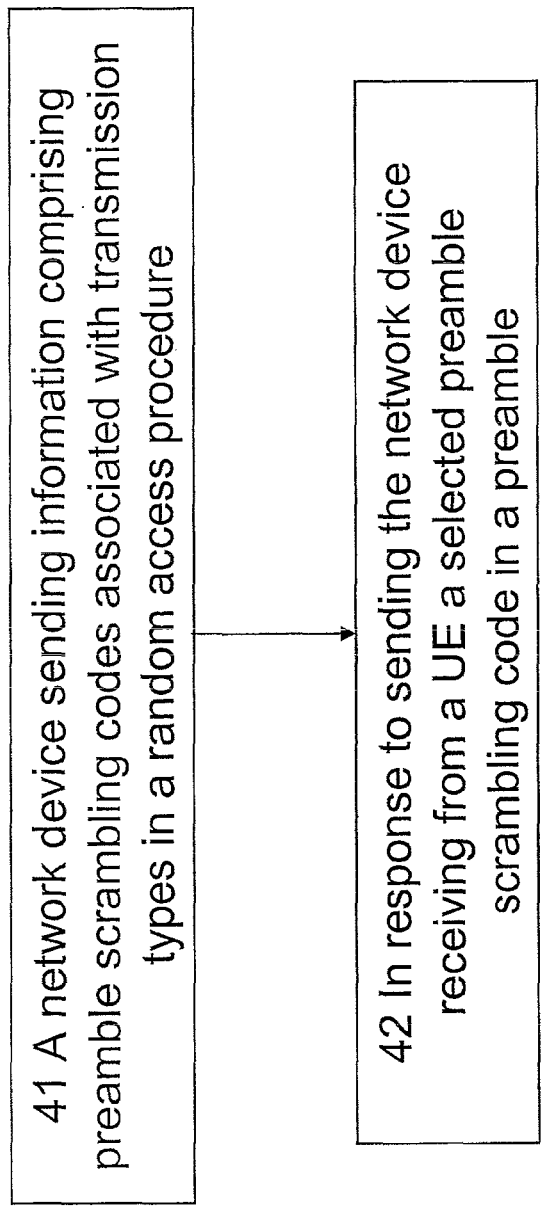
FIG. 4 illustrates a logic flow diagram that is descriptive of an exemplary embodiment of the Invention as executed by a network device.

Referring to FIG. 4, there is illustrated in an exemplary embodiment of the invention a logical flow diagram of a method including a network device sending information comprising preamble scrambling codes associated with transmission types in a random access procedure 410, and in response to sending the network device receiving from a UE a selected preamble scrambling code in a preamble 420.

A method as above further comprising decoding a preamble scrambling code of a random access channel transmission received from a user equipment, and determining a transmission type with which the scrambling code is associated. A method as in any above, further comprising decoding a remainder of the random access channel transmission received from the user equipment according to the determined transmission type. The method as in any above, where the determining is based on an association in a local memory of preamble scrambling codes associated with transmission types, for a transmission of that type.

In accordance with the exemplary embodiments of the invention there is a computer readable medium encoded with a computer program executable by a processor to perform actions comprising decoding a preamble scrambling code of a random access channel transmission received from a user equipment, and determining a transmission type with which the scrambling code is associated.

A computer readable medium encoded with a computer program as above, further comprising decoding a remainder of the random access channel transmission received from the user equipment according to the determined transmission type. Further, a computer readable medium encoded with a computer program as in any above where the determining is based on an association in a local memory of preamble scrambling codes associated with transmission types, for a transmission of that type.

In addition, in accordance with the exemplary embodiments of the invention there is an apparatus comprising a processor configured to decode a preamble scrambling code of a random access channel transmission received from a user equipment, and the processor configured to determine a transmission type with which the scrambling code is associated.

An apparatus as above, further comprising a processor further configured to decode a remainder of the random access channel transmission received from the user equipment according to the determined transmission type. An apparatus as in any above comprising a local memory, and where the determining is based on an association in the local memory of preamble scrambling codes associated with transmission types, for a transmission of that type.

Further, in accordance with the exemplary embodiments of the invention, there is an apparatus comprising means for decoding a preamble scrambling code of a random access channel transmission received from a user equipment, and means for determining a transmission type with which the scrambling code is associated.

An apparatus as above comprising means for decoding a remainder of the random access channel transmission received from the user equipment according to the determined transmission type. And an apparatus as in any above, comprising: means for storing an association of preamble scrambling codes associated with transmission types, and where the determining is based on an association in a local memory of preamble scrambling codes associated with transmission types, for a transmission of that type. In addition, there is an apparatus as in any above where the means for decoding, determining, and decoding comprises a processor and a memory.

In another exemplary embodiment of the invention there is storing in a local memory an association of preamble scrambling code to transmission type.

In another exemplary embodiment of the invention there is the UE using scrambling codes associated in memory with transmission type for a transmission of that type.

In still another exemplary embodiment of the invention there is the network device reading a scrambling code of a preamble of a received RACH transmission, determining from the scrambling code a transmission type, and decoding a remainder of the RACH transmission according to the determined transmission type.

In yet another exemplary embodiment of the invention there is a network device recognizing PRACH, with reference to associated scrambling code memory, received from the UE as an indication of UE capability.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Further, while the exemplary embodiments may have been described above in the context of the EUTRAN (UTRAN-LTE) system, it should be appreciated that the exemplary embodiments of this invention are not limited for use with only this one particular type of wireless communication system, and that they may be used to advantage in other wireless communication systems such as for example WLAN, UTRAN, GSM as appropriate).

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method comprising:
   receiving, by a network device, a broadcast message comprising information of preamble scrambling codes, wherein each of the preamble scrambling codes is assigned to only one of a respective high speed random access channel transmission type of high speed random access transmission channel types comprising a release 99 physical random access channel, an enhanced dedicated channel supporting 2 ms transmission time interval, and an enhanced dedicated channel supporting 10 ms transmission time interval random access transmission type;
   selecting a preamble scrambling code of the preamble scrambling codes based at least in part on the received information; and
   utilizing the selected preamble scrambling code in a preamble of a random access procedure to use a whole physical random access channel slot to access the assigned high speed random access channel transmission type.

2. The method according to claim 1, further comprising:
   storing in a local memory an association of the preamble scrambling codes assigned to the high speed random access channel transmission types, where the selecting is based at least in part on the stored association between the selected preamble scrambling code and the high speed random access channel transmission type to access.

3. The method according to claim 1, wherein the broadcast message is received from another network device.

4. A non-transitory computer-readable medium bearing computer program code embodied therein for use with a computer, the computer program code executed by at least one processor to perform actions comprising:
   receiving a broadcast message comprising information of preamble scrambling codes, wherein each of the preamble scrambling codes is assigned to only one of a respective high speed random access channel transmission type of high speed random access channel transmission types comprising a release 99 physical random access channel, an enhanced dedicated channel supporting 2 ms transmission time interval, and an enhanced dedicated channel supporting 10 ms transmission time interval random access transmission type;
   selecting a preamble scrambling code of the preamble scrambling codes based at least in part on the received information; and
   utilizing the selected preamble scrambling code in a preamble of a random access procedure to use a whole physical random access channel slot to access the assigned high speed random access channel transmission type.

5. The non-transitory computer-readable medium according to claim 4, further comprising the computer program code executed by the at least one processor to perform:
   storing in a local memory an association of the preamble scrambling codes assigned to the high speed random access channel transmission types, where the selecting is based at least in part on the stored association between the selected preamble scrambling code and the high speed random access channel transmission type to access.

6. The non-transitory computer-readable medium according to claim 4, wherein the broadcast message is received from a network device.

7. An apparatus comprising:
   at least one processor; and
   at least one memory including computer program code, where the at least one memory and the computer program code are configured, with the at least one processor, to cause the apparatus to at least:
   receive a broadcast message comprising information of preamble scrambling codes, wherein each of the preamble scrambling codes is assigned to only one of a respective high speed random access channel transmission type of different high speed random access channel transmission types comprising a release 99 physical random access channel, an enhanced dedicated channel supporting 2 ms transmission time interval, and an enhanced dedicated channel supporting 10 ms transmission time interval;
   select a preamble scrambling code of the preamble scrambling codes based at least in part on the received information; and
   utilize the selected preamble scrambling code in a preamble for a random access procedure to use a whole physical random access channel slot to access the assigned high speed random access channel transmission type.

8. The apparatus according to claim 7, wherein the at least one memory including the computer program code is configured with the at least one processor to cause the apparatus to store an association of the preamble scrambling codes assigned to the high speed random access channel transmission types, where the selecting is based at least in part on the stored association between the selected preamble scrambling code and the high speed random access channel transmission type to access.

9. The apparatus according to claim 7, wherein the broadcast message is received from a network device.

10. A method comprising:
    decoding a preamble scrambling code of a high speed random access channel transmission received from a user equipment; and
    determining a high speed random access channel transmission type with which the scrambling code is assigned, wherein the preamble scrambling code is assigned to only one of a respective high speed random access channel transmission type comprising a release 99 physical random access channel, an enhanced dedicated channel supporting 2 ms transmission time interval, and an enhanced dedicated channel supporting 10 ms transmission time interval, and wherein the preamble scrambling code is associated with a respective high speed random access channel transmission type in the random access procedure using a whole physical random access channel slot.

11. The method according to claim 10, further comprising:
    decoding a remainder of the high speed random access channel transmission received from the user equipment according to the determined high speed random access channel transmission type.

12. The method according to claim 10, wherein the determining is based at least in part on an assignment in a local memory of preamble scrambling codes to transmission types, for a transmission of that high speed random access channel transmission type.

13. A non-transitory computer-readable medium bearing computer program code embodied therein for use with a computer, the computer program code executed by at least one processor to perform actions comprising:
  decoding a preamble scrambling code of a high speed random access channel transmission received from a user equipment; and
  determining a high speed random access channel transmission type with which the scrambling code is assigned, wherein the preamble scrambling code is assigned to only one of a respective high speed random access channel transmission type comprising a release 99 physical random access channel, an enhanced dedicated channel supporting 2 ms transmission time interval, and an enhanced dedicated channel supporting 10 ms transmission time interval, and wherein the preamble scrambling code is associated with a respective high speed random access channel transmission type in the random access procedure using a whole physical random access channel slot.

14. The non-transitory computer-readable medium according to claim 13, further comprising the computer program code executed by the at least one processor to perform: decoding a remainder of the high speed random access channel transmission received from the user equipment according to the determined high speed random access channel transmission type.

15. The non-transitory computer-readable medium according to claim 13, wherein the determining is based at least in part on an assignment in a local memory of the preamble scrambling code to the high speed random access channel transmission type, for a transmission of that high speed random access channel transmission type.

16. An apparatus comprising:
  at least one processor; and
  at least one memory including computer program code, where the at least one memory and the computer program code are configured, with the at least one processor, to cause the apparatus to at least:
  decode a preamble scrambling code of a high speed random access channel transmission received from a user equipment; and
  determine a high speed access channel transmission type with which the scrambling code is assigned, wherein the preamble scrambling code is assigned to only one of a respective high speed random access channel transmission type comprising a release 99 physical random access channel, an enhanced dedicated channel supporting 2 ms transmission time interval, and an enhanced dedicated channel supporting 10 ms transmission time interval, and wherein the preamble scrambling code is associated with a respective high speed random access channel transmission type in the random access procedure using a whole physical random access channel slot.

17. The apparatus according to claim 16, wherein the at least one memory including the computer program code is configured with the at least one processor to cause the apparatus to decode a remainder of the high speed random access channel transmission received from the user equipment according to the determined high speed random access channel transmission type.

18. The apparatus according to claim 16, wherein the determining is based at least in part on an assignment in a local memory of the preamble scrambling code to the high speed random access channel transmission type, for a transmission of that high speed random access channel transmission type.

* * * * *